US008122273B2

(12) United States Patent
Goodnow et al.

(10) Patent No.: US 8,122,273 B2
(45) Date of Patent: *Feb. 21, 2012

(54) STRUCTURE AND METHOD TO OPTIMIZE COMPUTATIONAL EFFICIENCY IN LOW-POWER ENVIRONMENTS

(75) Inventors: Kenneth J. Goodnow, Essex Junction, VT (US); Clarence R. Ogilvie, Huntington, VT (US); Sebastian T. Ventrone, South Burlington, VT (US); Keith Williams, Essex Junction, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 564 days.

This patent is subject to a terminal disclaimer.

(21) Appl. No.: 11/870,575

(22) Filed: Oct. 11, 2007

(65) Prior Publication Data
US 2009/0024859 A1    Jan. 22, 2009

Related U.S. Application Data

(63) Continuation-in-part of application No. 11/779,432, filed on Jul. 18, 2007.

(51) Int. Cl.
*G06F 1/26* (2006.01)
*G06F 1/32* (2006.01)

(52) U.S. Cl. .................. 713/340; 713/300; 713/322

(58) Field of Classification Search ........... 713/300–340
See application file for complete search history.

(56) References Cited

U.S. PATENT DOCUMENTS

| | | | |
|---|---|---|---|
| 5,560,022 A * | 9/1996 | Dunstan et al. ............ 713/300 |
| 6,400,773 B1 * | 6/2002 | Krongold et al. ............ 375/260 |
| 6,762,629 B2 | 7/2004 | Tam et al. |
| 7,051,306 B2 | 5/2006 | Hoberman et al. |
| 7,188,261 B1 * | 3/2007 | Tobias et al. ................ 713/300 |
| 7,725,747 B2 * | 5/2010 | Zimmer et al. .............. 713/322 |
| 2003/0079150 A1 * | 4/2003 | Smith et al. ................. 713/320 |
| 2004/0117680 A1 * | 6/2004 | Naffziger ..................... 713/322 |
| 2005/0033707 A1 * | 2/2005 | Ehlers et al. ................ 705/412 |
| 2006/0095824 A1 * | 5/2006 | McGrath ...................... 714/741 |
| 2006/0174149 A1 | 8/2006 | Hottelet et al. |
| 2006/0294400 A1 * | 12/2006 | Diefenbaugh et al. ....... 713/300 |
| 2008/0077817 A1 * | 3/2008 | Brundridge et al. ......... 713/340 |

OTHER PUBLICATIONS

What We Can Learn from the Intel "Montecito" Dual-Core Itanium Chip, Chandu Visweswariah, Jun. 21, 2005.
Final Office Action from U.S. Appl. No. 11/779,432 dated Sep. 24, 2010.
Office Action for corresponding U.S. Appl. No. 11/779,432 dated Jan. 18, 2011.
Notice of Allowance dated Jun. 21, 2011 for corresponding U.S. Appl. No. 11/779,432.

* cited by examiner

*Primary Examiner* — Dennis M Butler
(74) *Attorney, Agent, or Firm* — David Cain; Roberts Mlotkowski Safran & Cole, P.C.

(57) ABSTRACT

A method and structure to optimize computational efficiency in a low-power environment. A design structure is embodied in a machine readable medium used in a design process. The design structure includes a component to determine an optimal point for maximizing computational efficiency in a low-power environment, and a component to selectively control operation of at least one processing unit of a plurality of processing units in accordance with the determined optimal point. The design structure further includes at least one of a component for controlling a frequency of a clock signal transmitted to the at least one processing unit in accordance with the determined optimal point, and a component for determining a present power available.

19 Claims, 13 Drawing Sheets

STRUCTURE AND METHOD TO OPTIMIZE COMPUTATIONAL EFFICIENCY IN LOW-POWER ENVIRONMENTS

CROSS-REFERENCE TO RELATED APPLICATIONS

The present application is a continuation in part of U.S. application Ser. No. 11/779,432, filed on Jul. 18, 2007, the disclosure of which is expressly incorporated by reference herein in its entirety.

DESCRIPTION

1. Field of the Invention

The present invention relates to a structure and method to optimize computational efficiency in low-power environments. The invention further relates to a design structure on which a subject circuit resides.

2. Background Description

Computational efficiency is defined as a computational rate per available power. Classic design approaches do not always achieve optimal efficiency due to thermal losses of voltage regulation and non-optimal load-matching for variable power sources. Furthermore, the classic design approaches may include components, e.g., voltage regulators, that have a high cost.

In low-power environments, e.g., a solar power environment, not only may the power supply be low, but the power supply may vary as the environmental conditions generating the power vary. For example, the sun may move behind clouds, thus reducing the amount of power generated by a solar cell. Under these conditions, classic design approaches utilize voltage regulation to output a constant voltage, to minimize the variable power of the power source. However, voltage regulation requires the use of voltage regulators, which have a high associated cost. Additionally, voltage regulation has an associated thermal power loss. Power losses, e.g., thermal losses, in low-power environments may be intolerable, as in low-power environments, by definition, there is not much excess power available.

Additionally, classic design approaches do not always achieve optimal efficiency due to non-optimal load-matching for variable power sources. As low-power environments may produce varying amounts of power under different operating conditions, or environmental conditions, non-optimal load-matching may occur. For example, on a day with scattered clouds, a solar cell may produce varying amounts of power as the clouds move in and out between the sun and the solar cell. Classic design approaches may not prevent non-optimal load matching that may occur under these dynamic conditions Accordingly, there exists a need in the art to overcome the deficiencies and limitations described hereinabove.

SUMMARY OF THE INVENTION

In a first aspect of the invention, a structure for optimizing computational efficiency in a low-power environment includes a plurality of processing units, a load manager controlling selective parallel operation of at least one processing unit of the plurality of processing units, and an unregulated power source.

In a second aspect of the invention, a method to optimize computational efficiency in a low-power environment includes determining an optimal point for maximizing computational efficiency in a low-power environment, and selectively controlling operation of at least one processing unit of a plurality of processing units in accordance with the determined optimal point.

In another aspect of the invention, a computer program product includes a computer usable medium having readable program code embodied in the medium. The computer program product includes at least one component to determine an optimal point for maximizing computational efficiency in a low-power environment and selectively control operation of at least one processing unit of a plurality of processing units in accordance with the determined optimal point.

In another aspect of the invention, there is a design structure embodied in a computer readable medium for performing a method. The design structure comprises a component for: determining an optimal point for maximizing computational efficiency in a low-power environment; and selectively controlling operation of at least one processing unit of a plurality of processing units in accordance with the determined optimal point.

In another aspect of the invention, there is a design structure embodied in a machine readable medium used in a design process, the design structure comprising a component to determine an optimal point for maximizing computational efficiency in a low-power environment, and a component to selectively control operation of at least one processing unit of a plurality of processing units in accordance with the determined optimal point. The design structure further comprises at least one of: a component for controlling a frequency of a clock signal transmitted to the at least one processing unit in accordance with the determined optimal point, and a component for determining a present power available.

In embodiments, the design structure comprises a netlist, which describes the circuit. In further embodiments, the design structure resides on storage medium as a data format used for the exchange of layout data of integrated circuits. In additional embodiments, the design structure includes at least one of test data files, characterization data, verification data, or design specifications.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention relates to a structure and method to optimize computational efficiency in low power environments. Low power environments, in embodiments, may include solar power sources, e.g., solar cells, wind power sources, thermoelectric power sources, e.g., body heat or frictional heating, and mechanical to electrical conversion power sources, e.g., piezoelectric, vibrational, rotational, etc. In particular, the invention provides a method to determine an optimal point for maximizing computational efficiency in a low-power environment, and the related structure to control a plurality of processing units in accordance with the determined optimal point. By implementing the invention, it is possible to eliminate voltage regulation and the related drawbacks of voltage regulation, while maximizing computational efficiency in a low-power environment.

Figure 1:
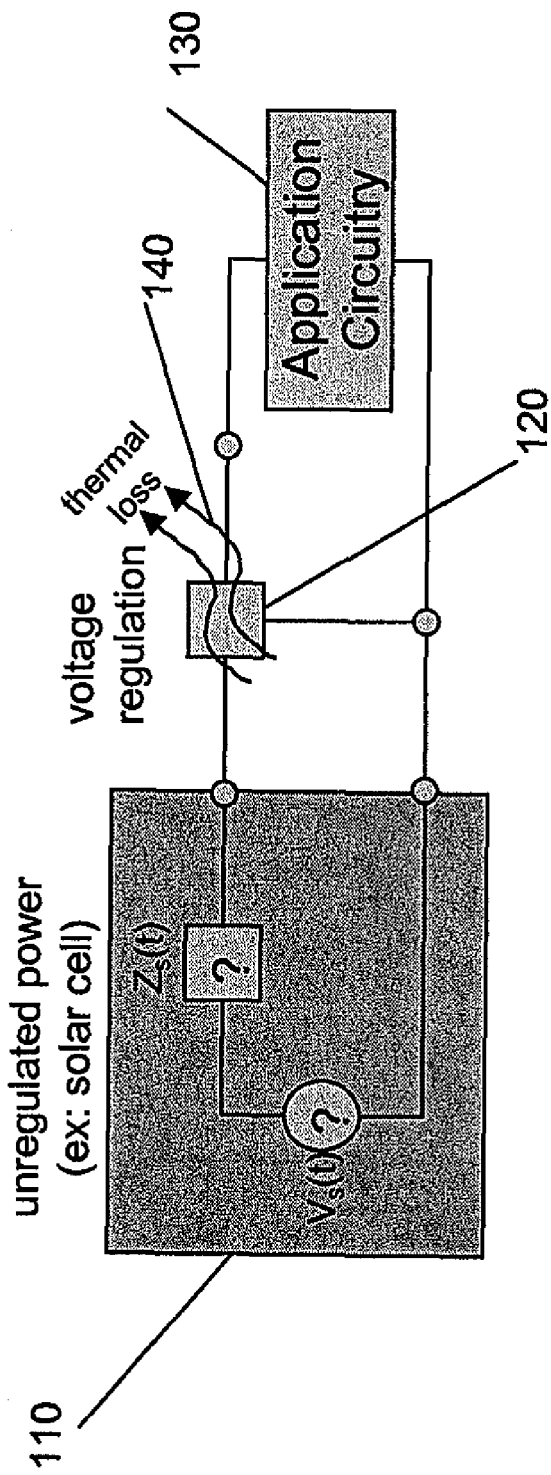
FIG. 1 shows an example of voltage regulation in a low-power environment.

FIG. 1 shows an example of voltage regulation in a low-power environment. In particular, FIG. 1 shows a low-power, unregulated power source, e.g., a solar cell 110. In FIG. 1, the unregulated power source 110 is connected, through a voltage regulator 120, to application circuitry 130 to provide power to the application circuitry 130. Further, as shown in FIG. 1, the voltage regulator 120 has an associated thermal loss 140.

Load Manager

Figure 2:
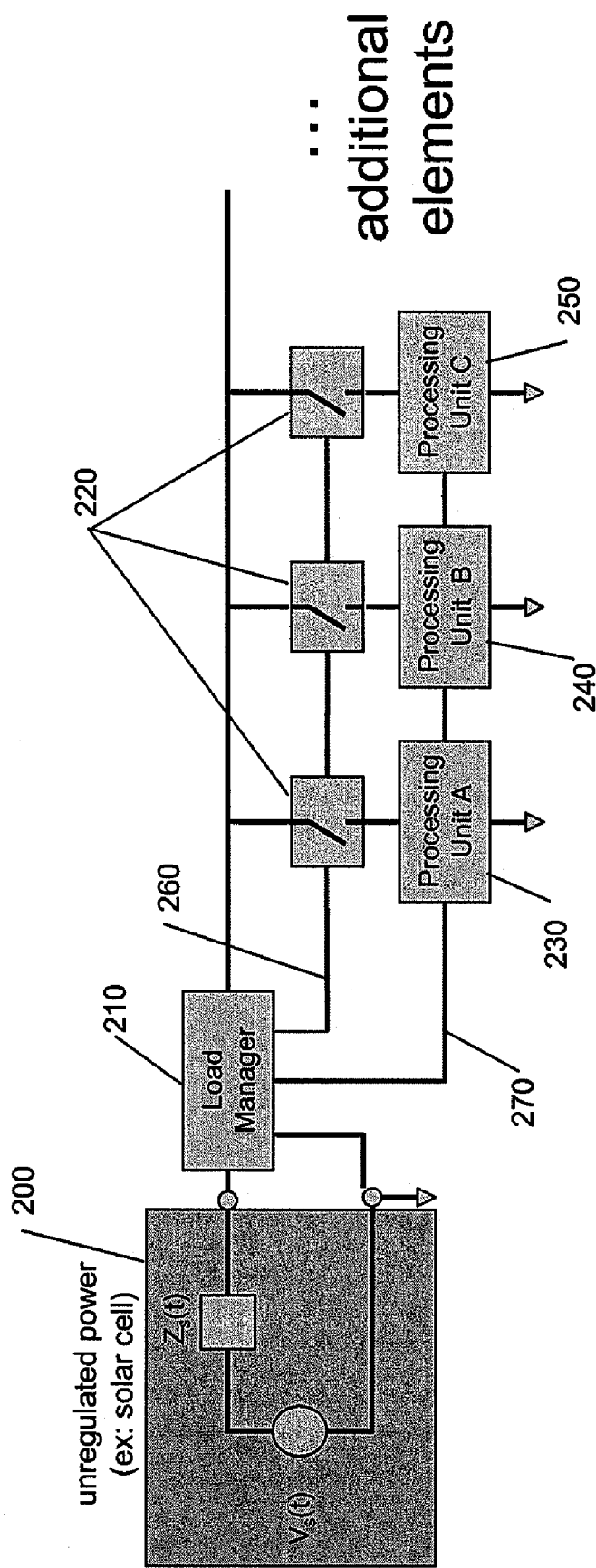
FIG. 2 shows a structure according to an aspect of the invention.

FIG. 2 shows an exemplary embodiment according to an aspect of the invention. In FIG. 2, a low-power, unregulated power source, e.g., a solar cell 200 is coupled to a load manager 210 such that the load manager 210 receives power from the unregulated power source 200. The load manager 210 provides power to processing units 230, 240 and 250 through individual processing unit switches 220. Additionally, control lines 260 connect the load manager 210 to the individual processing unit switches 220, to control selective operation of the switches. Also, the load manager 210 is connected to the processing units via connection 270. This connection 270 permits the load manager 210 to send a clock signal to the active processing units. In embodiments, the processing units may be digital circuits, state machines and/or classes of circuits that can be controlled by frequency. Additionally, it should be understood that while FIG. 2 shows only three processing units, the invention contemplates any number of processing units.

In embodiments, the load manager 210 may select a number of active units to run in parallel and a frequency of operation of the selected active units. Additionally, in embodiments, the load manager 210 may measure the presently-available power and maintain an appropriate processing load.

Figure 3:
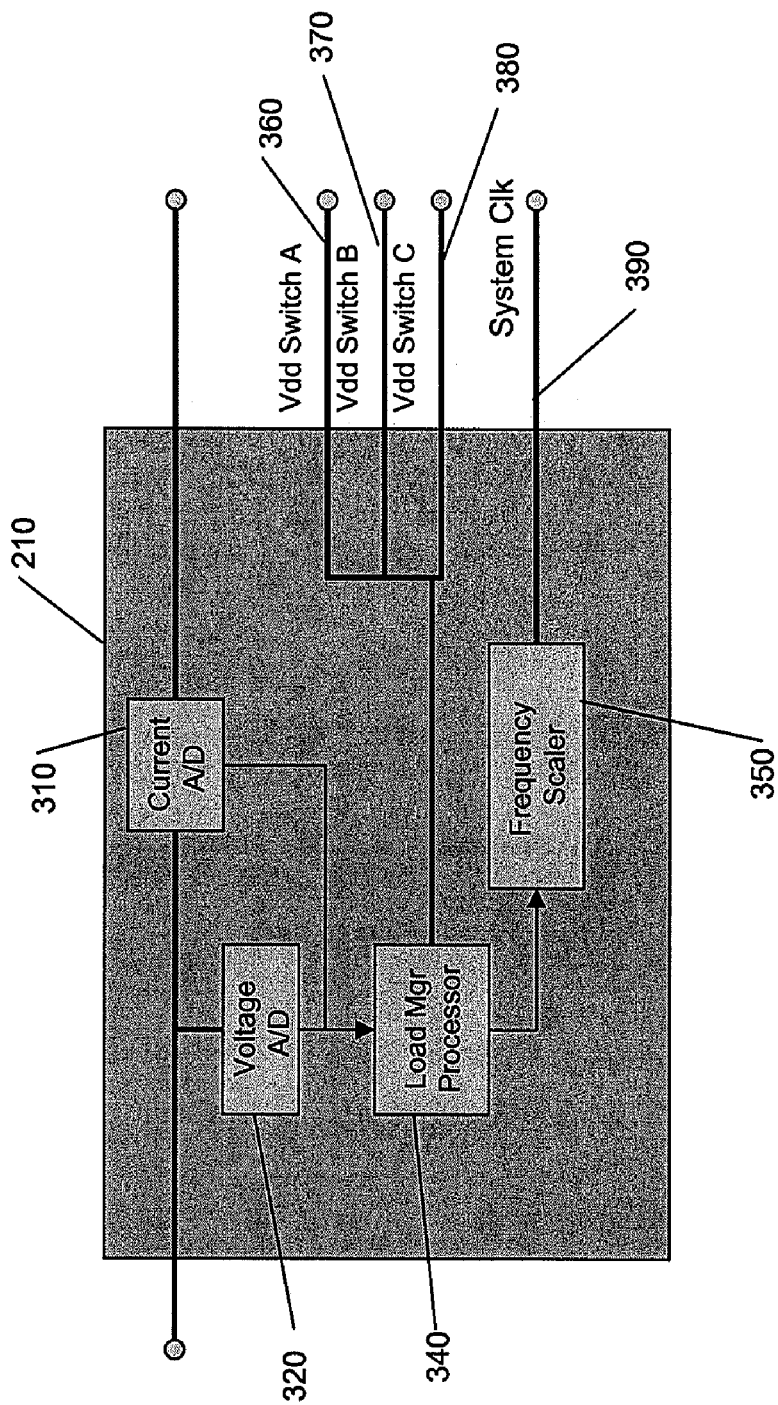
FIG. 3 shows an exemplary embodiment of a load manager according to an aspect of the invention.

FIG. 3 shows the load manager 210 according to an embodiment of the invention. According to this embodiment of the invention, the load manager 210 may monitor voltage and current supplied by the power source to the application circuitry. As shown in FIG. 3, the load manager 210 may have a current analog-to-digital converter 310, which measures the supplied current. The load manager 210 also includes a voltage analog-to-digital converter 320, which measures the supplied voltage. Further, according to the first embodiment of the invention, the load manager 210 may include a frequency scaler 350, which generates a clock signal 390 to each of the active units (processor units).

Additionally, the load manager 210 may include a load manager processor 340, which, in embodiments, may be a digital state machine or a computation processing unit. The system clock signal 390 may be slowed or sped up through control of the load manager processor 340. In embodiments, the load manager processor 340 determines the optimal frequency, and through a connection with the frequency scaler 350, controls the system clock frequency output 390 of the frequency scaler 350 as discussed herein. Additionally, the load manager processor 340 determines a switch configuration to select the active computational processing units, or which computational processing units are powered on, through switches 360, 370 and 380 as discussed herein.

Figure 4:
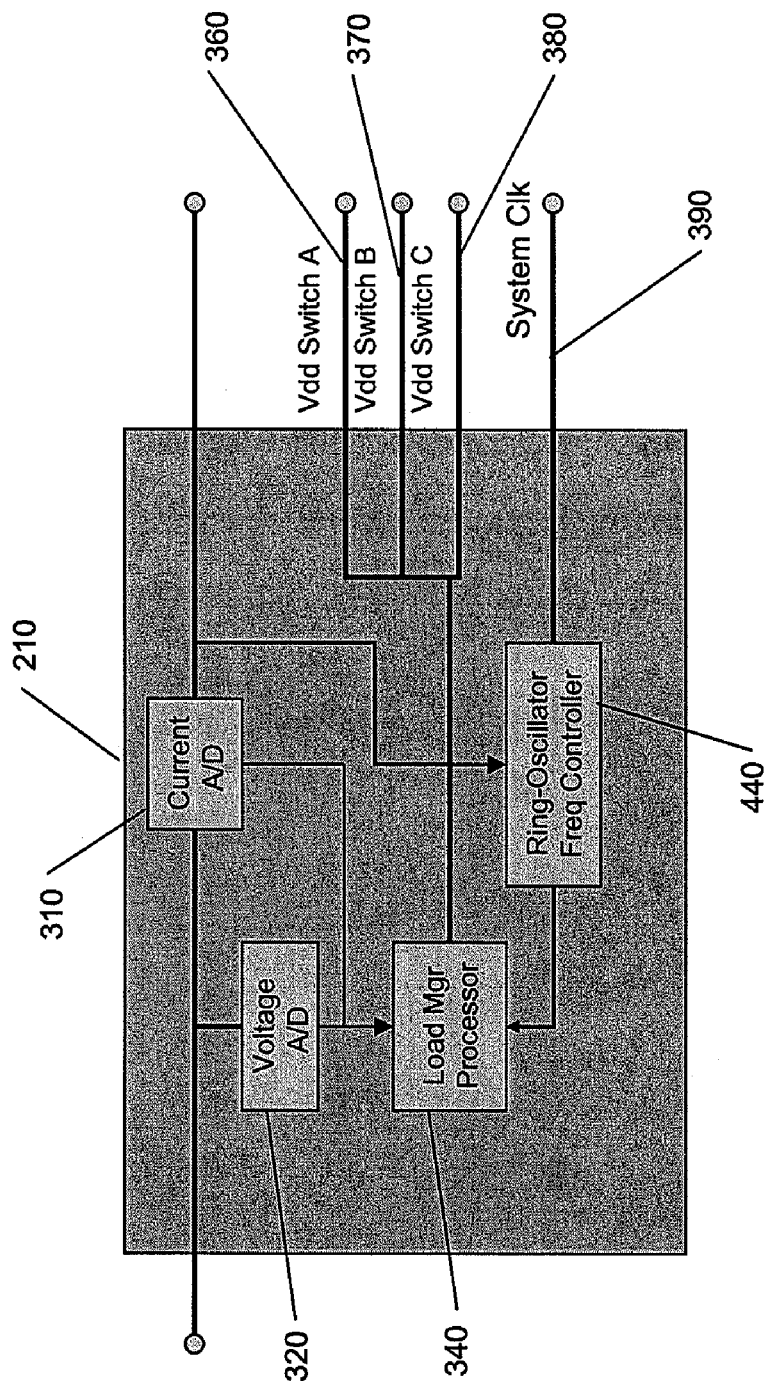
FIG. 4 shows another exemplary embodiment of a load manager according to an aspect of the invention.

FIG. 4 shows another embodiment of a load manager 210, according to a further aspect of the invention. In this embodiment, the load manager 210 monitors voltage and current supplied by the power source to the application circuitry. As shown in FIG. 4, the load manager 210 includes a current analog-to-digital converter 310 to measure the supplied current and a voltage analog-to-digital converter 320 to measure the supplied voltage.

Furthermore, according to this embodiment of the load manager, as shown in FIG. 4, the load manager 210 includes a ring oscillator frequency controller 440. The ring oscillator frequency controller 440 generates a clock signal 390 with a frequency adjusted to a maximum attainable frequency for a given power supply voltage, i.e., run as fast as possible, but not faster. The ring oscillator frequency controller 440 receives power from the low-power source, and sends a clock signal 390 to the activated processing units. Additionally, the ring oscillator frequency controller 440 sends the generated clock signal to a load manager processor 340.

Additionally, the load manager 210 may include a load manager processor 340, which, in embodiments, may be a digital state machine or a computation processing unit. As shown in FIG. 4, the load manager processor 340 receives power from the low-power source. Further, the load manager processor 340 determines a switch configuration to select the active processing units or which computational processing units are powered on, through switches 360, 370 and 380.

Determining Optimal Point for Present Operating Conditions

According to an aspect of the invention, an optimal point for maximizing computational efficiency may be determined for the present operating conditions (i.e., present amount of available power). Further, according to an aspect of the invention, the load manager 210 may measure or sense the present operating conditions to determine an optimal point. Additionally, in embodiments, the load manager 210 may determine the optimal point for maximizing computational efficiency through an iterative process.

Figure 5:
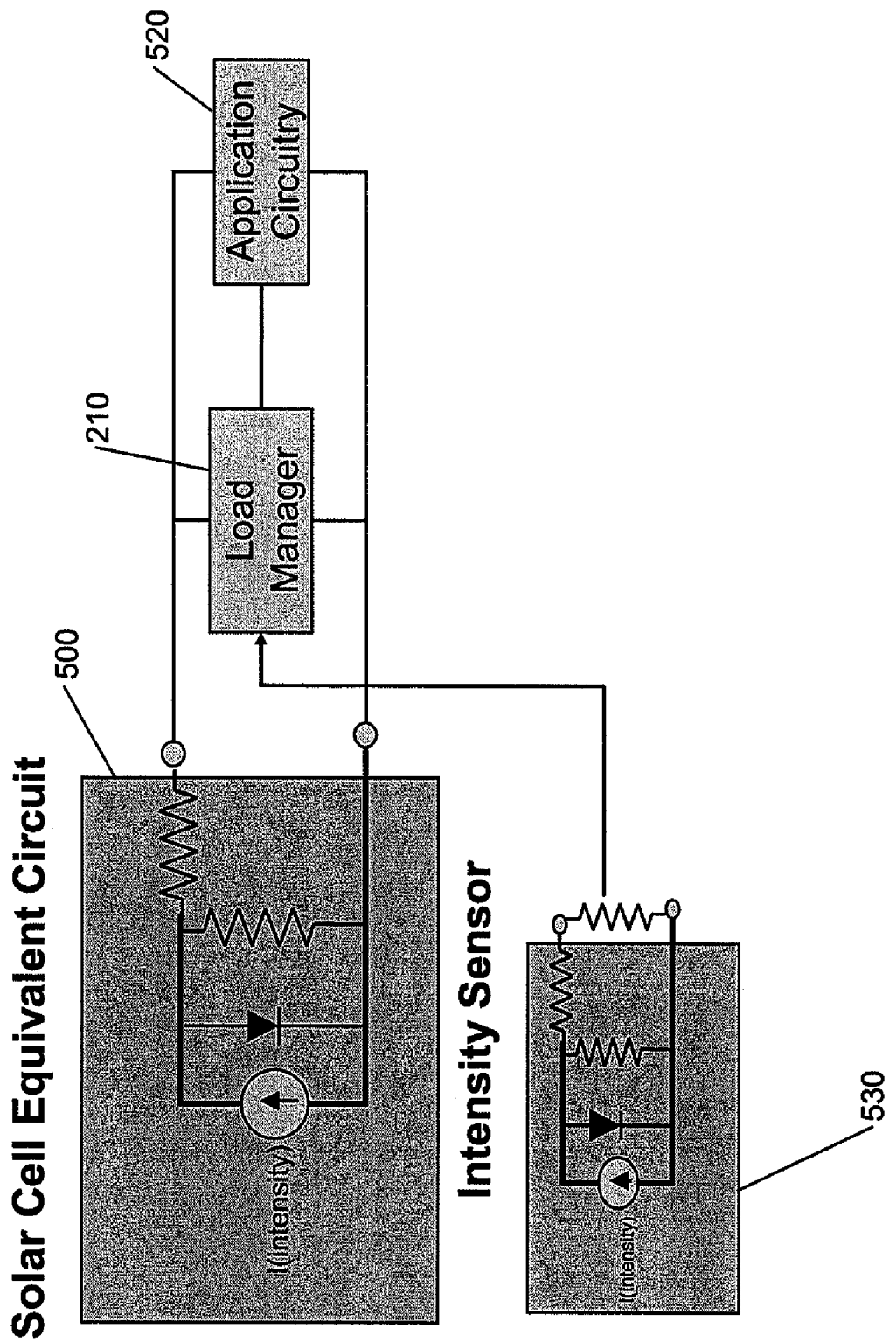
FIG. 5 is a structure according to an aspect of the invention.

More specifically, in an embodiment of the invention, a load manager 210 may measure a present power condition, for example, with a solar sensing element. FIG. 5 shows a solar cell equivalent circuit 500 connected to a load manager 210 and application circuitry 520. Additionally, as shown in FIG. 5, in the case of a solar cell, a separate sensing element 530 can be used to determine the intensity of the solar emissions, and thus the available power under the present environmental conditions, as discussed further below.

Knowing the present power condition, the load manager 210 can determine the optimal point for maximizing computational efficiency in low-power environments through accessing an applicable surface plot of operations/second as a function of frequency and number of operating units for the present power condition from a storage device containing a plurality of pre-determined surface plots. The generation, or creation, of the pre-determined surface plots is explained further below. Furthermore, according to this embodiment, the load manager 210 may determine the optimal point for maximizing computational efficiency from the accessed applicable surface plot.

In a further aspect of the invention, the load manager 210 may infer a present power condition by measuring the present voltage and current. Knowing the present voltage and current, the load manager 210 may access an applicable voltage-current (V-I) curve for the present voltage and current from a storage device containing a plurality of pre-determined V-I curves. The generation or creation of the pre-determined V-I curves is explained further below. Furthermore, according to this embodiment, the load manager 210 may determine the optimal point for maximizing computational efficiency from the accessed applicable V-I curve.

Additionally, in a further aspect of the invention, an optimal point for maximizing computational efficiency may be determined without sensing the present operating conditions. More specifically, using the load manager 210 of FIG. 3, which includes a frequency scaler 350, the load manager 210 may iteratively search for the optimal point for maximizing computational efficiency.

Furthermore, an optimal point for maximizing computational efficiency may be determined without sensing the present operating conditions. More specifically, using the load manager 210 of FIG. 4, which includes a ring oscillator frequency controller 440, the load manager 210 may iteratively search for the optimal point for maximizing computational efficiency.

Determining Optimal Point Using a Surface Plot

An optimal point for a present operating condition may be determined by sensing or measuring directly the available power, e.g., by measuring the sun directly. By knowing the present power available, or present operating condition, an applicable surface plot of operations per second as a function of frequency and number of operating units may be accessed from a database of surface plots. Additionally, an optimal point for maximizing computational efficiency in low-power environments may be determined from the applicable surface plot for the present operating condition. Furthermore, according to an aspect of the invention, the database of surface plots may contain a plurality of pre-determined surface plots, wherein each surface plot is applicable for a particular power condition (e.g., amount of sunlight when using a solar cell).

Figure 6:
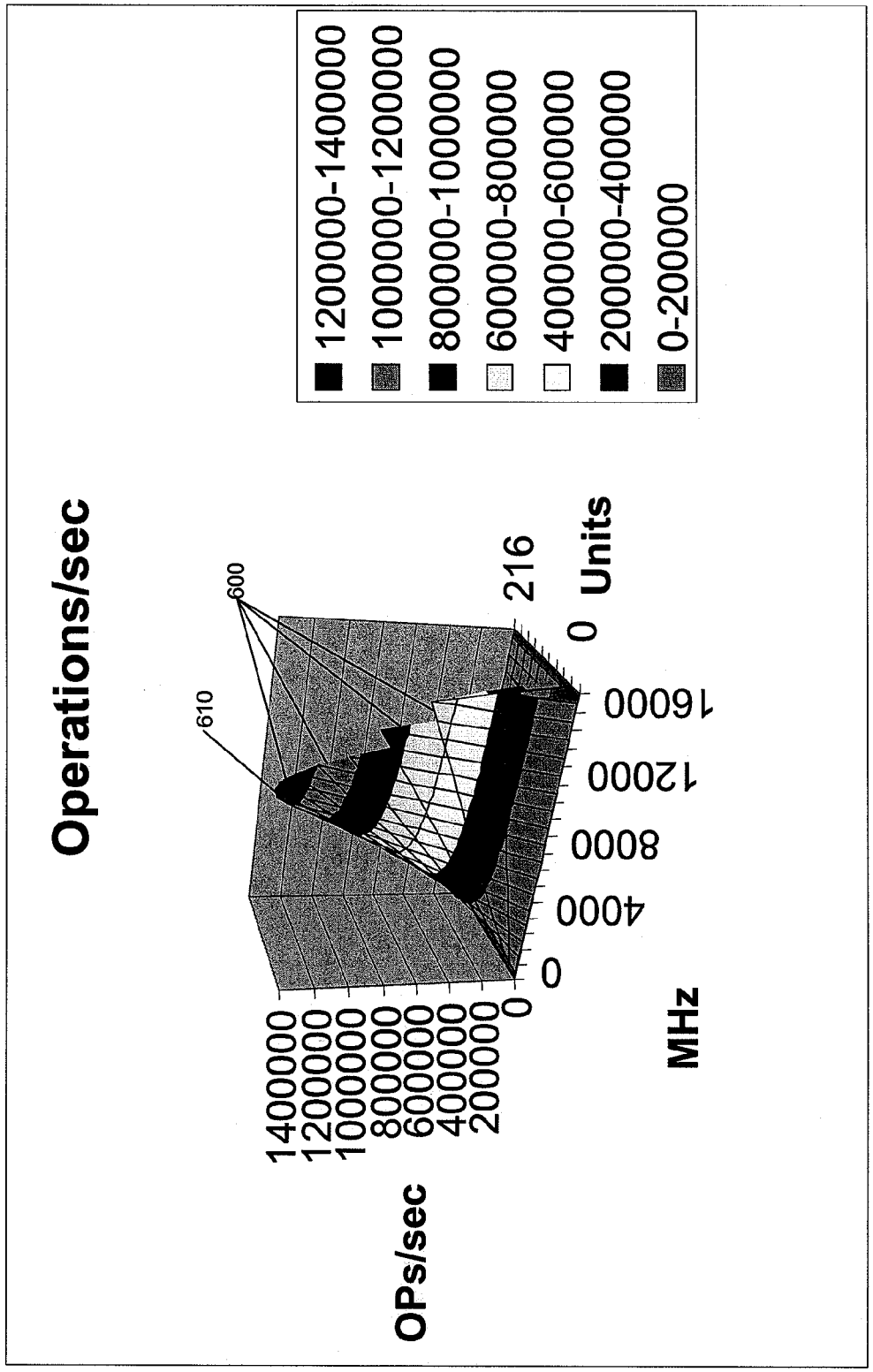
FIG. 6 is a surface plot for a particular power supply condition according to an aspect of the invention.
Figure 7:
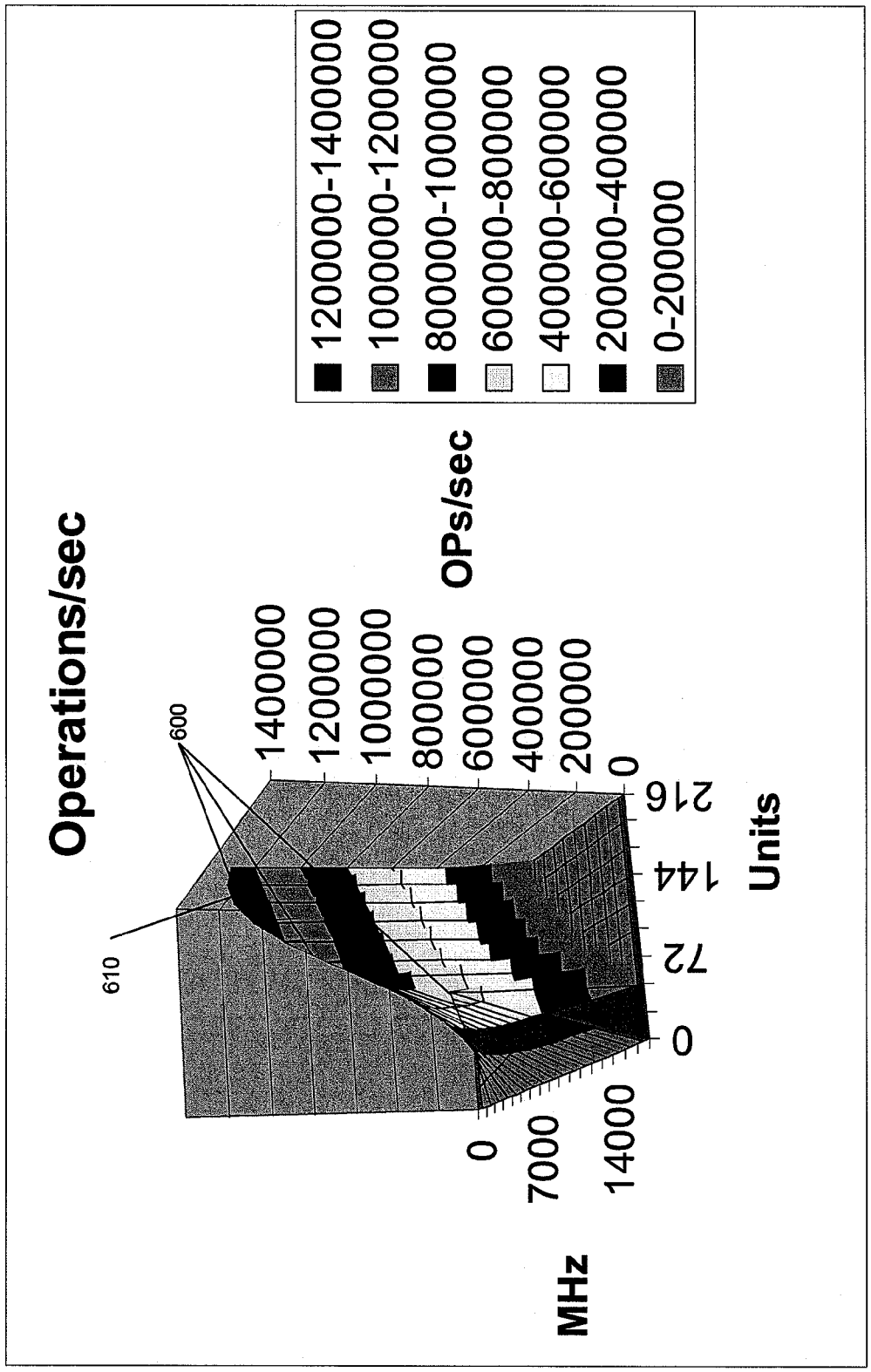
FIG. 7 is an alternate view of the surface plot for a particular power supply condition of FIG. 6 according to an aspect of the invention.

FIGS. 6 and 7 show two views of an exemplary surface plot of operations/second as a function of frequency and number of operating units developed from a solar cell V-I curve and energy per operation curve, according to an aspect of the invention. As explained below, a plurality of surface plots may be developed from a plurality of V-I curves (example shown in FIG. 9) and an energy per operation curve (example shown in FIG. 13), according to an aspect of the invention.

As shown in FIGS. 6 and 7, a maximum point or peak 610 along a drop-off, or cliff, 600 may be observed, which represents the best combination of frequency and operating units for a given power condition. Thus, the surface plot shown in FIGS. 6 and 7 indicates a best operating point (e.g., the peak 610) for maximizing computational efficiency for a single power condition, e.g., light intensity when using a solar cell.

Thus, using the surface plot, the load manager 210 may identify the applicable surface plot and the peak 610 on the applicable surface plot, which is the best combination of frequency and number of operating units for a particular condition. Knowing the location of the peak 610 on the applicable surface plot, and thus the data associated with the peak 610, the load manager 210 may set the frequency and number of operating units in accordance with the data associated with the location of the peak 610 to maximize computational efficiency for the current operating conditions (e.g., amount of sunlight when using a solar cell).

It should be understood that a plurality of surface plots representing the operations per second as a function of frequency and number of active units can be generated, with each surface plot representing a particular operating condition. Furthermore, these surface plots may be based upon the power supply characteristics and the processing unit characteristics. Thus, according to an aspect of the invention, the power supply characteristics are determined by generating a plurality of V-I curves for possible power inputs from the low-power source, e.g., solar cell. Additionally, according to the invention, the characteristics of the processing unit, or units, are determined. Then, with the determined power supply characteristics and the processing unit characteristics, the plurality of surface plots may be generated, as discussed below.

Determining Power Supply Characteristics

According to an aspect of the invention, the power supply characteristics (i.e., the plurality of V-I curves) may be determined in order to generate the plurality of surface plots. Additionally, the plurality of V-I curves may be used to determine an optimal point for maximizing computational efficiency by inferring a present power condition according to an embodiment of the invention, as described below.

Figure 8:
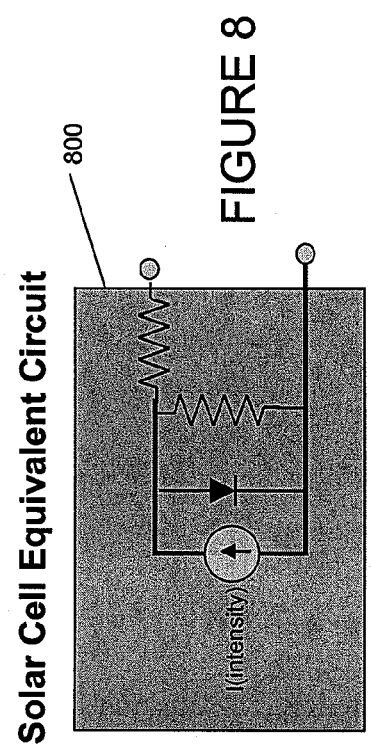
FIG. 8 shows a solar cell equivalent circuit according to an aspect of the invention.
Figure 9:
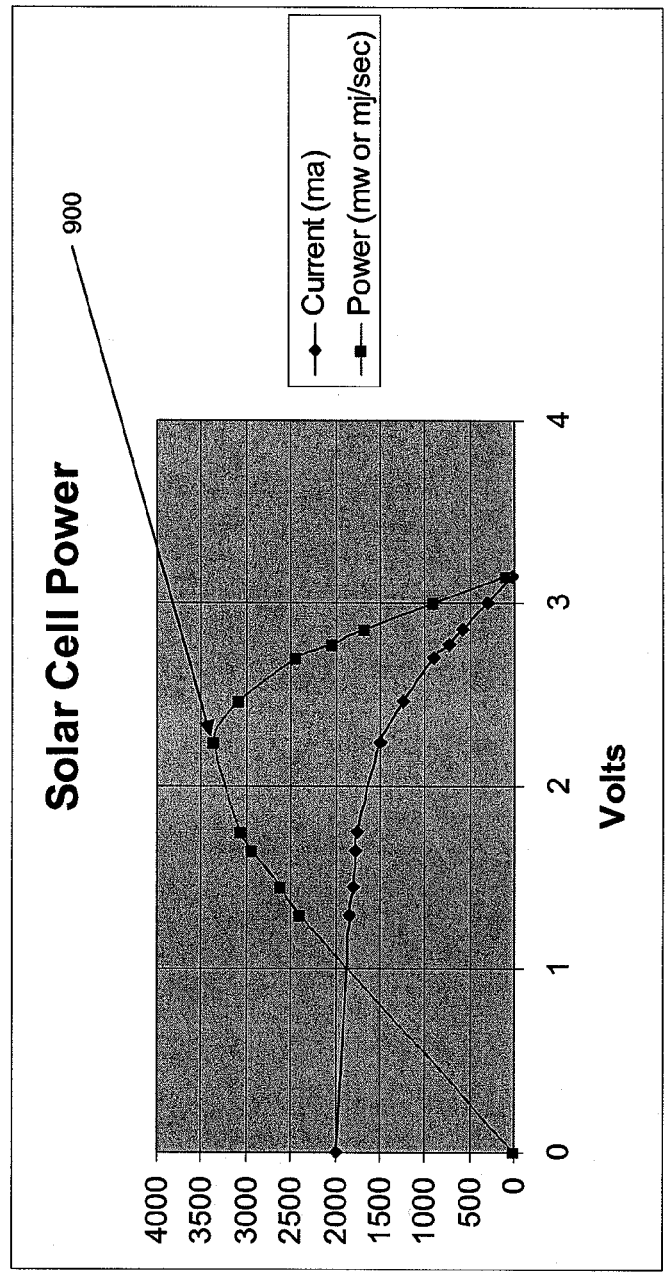
FIG. 9 is a plot of load voltage versus current and power for a solar cell power source for a particular environmental condition.

FIG. 8 shows an example of a low-power power source, and more specifically a solar cell equivalent circuit 800, according to an aspect of the invention. FIG. 9 shows the resultant V-I curve for one particular operating condition (e.g., solar intensity) of the solar cell equivalent circuit 800.

With an unregulated voltage, a V-I curve (e.g., FIG. 9) is dependent upon the particular operating condition, e.g., the amount of sunlight received by a solar cell. For example, a solar power source, e.g., a solar cell, will have a V-I curve for a given light intensity. Furthermore, for a given light intensity, there will be an optimal point, or maximum power generation, e.g., peak 900, for the solar cell. However, different light intensities may have slightly different optimal points.

Thus, the optimum power (e.g., peak 900) indicated by FIG. 9 may only be applicable for that particular operating condition. In other words, if the operating conditions change, e.g., clouds obscure the sunlight, effectively reducing the power generated by a solar cell, a different V-I curve may be applicable.

Figure 10:
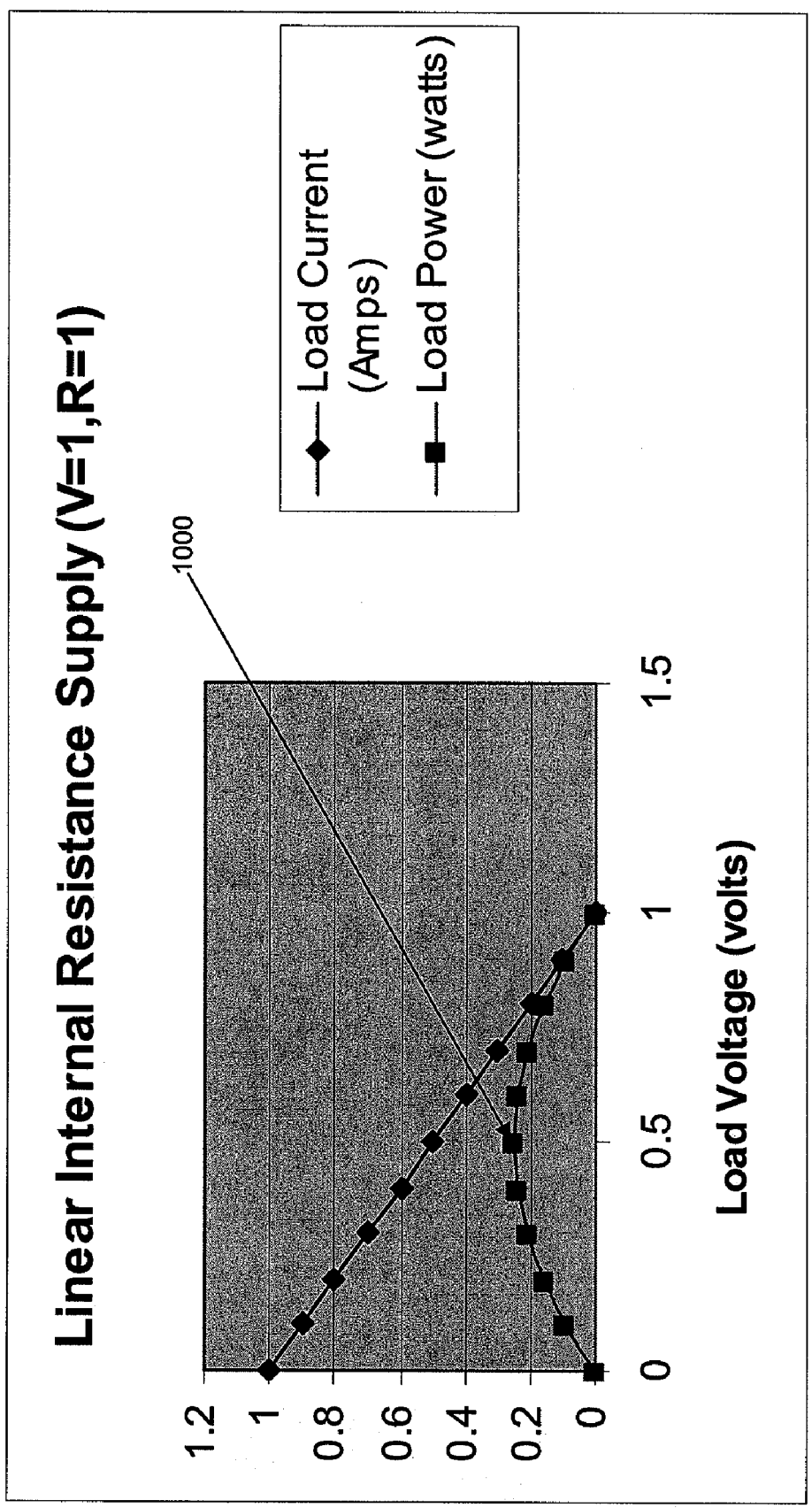
FIG. 10 is a plot of load voltage versus current and power for an ideal power source.

FIG. 10 shows a voltage-current (V-I) curve for an ideal power source. As shown in FIG. 10, the linear internal resistance power supply results in a load power curve with an optimum power (e.g., peak 1000) at a load voltage of about 0.5 volts. Further, as the power source is an ideal power source, the resultant V-I curve, and thus the load voltage at which optimum load power is achieved, does not vary.

Thus, according to the invention, a plurality of V-I curves may be generated for a range of power conditions, e.g., environmental conditions, such as light intensities, each indicating an optimal point for that given power condition, e.g., light intensity. Furthermore, according to the invention, the plurality of V-I curves may be stored in a database.

Determining Processing Unit Characteristics

Additionally, according to an aspect of the invention, the processing unit characteristics may be determined in order to generate the plurality of surface plots. Accordingly, a minimum voltage to run a block of circuitry across a desired frequency range may be determined. Furthermore, the power usage of this block of circuitry across the same frequency at the minimum voltage may be determined. Thus, for a processing unit, the energy/operation versus the supply voltage (just sufficient to meet performance) may be determined.

Figure 11:
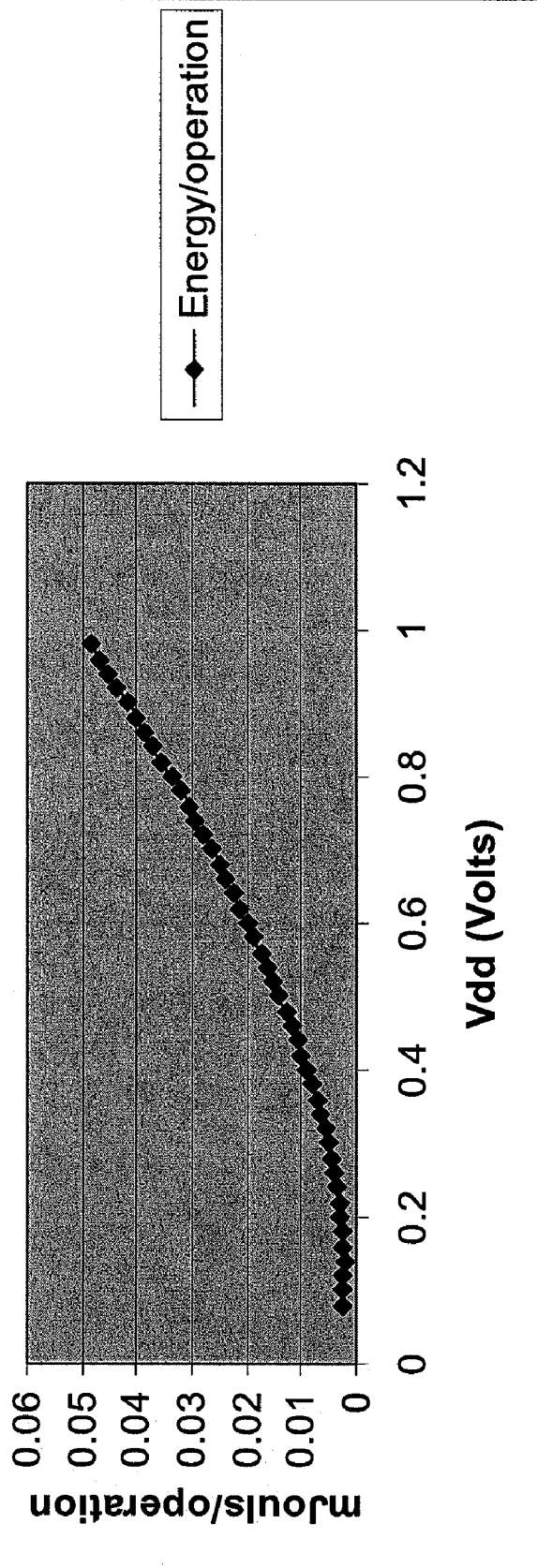
FIG. 11 is a plot of energy/operation versus supply voltage according to an aspect of the invention.

FIG. 11 shows an example of a plot of energy/operation versus supply voltage for a processing unit (in this example, a ring oscillator built using elements from an existing CMOS technology), with the supply voltage just sufficient to meet performance. According to an aspect of the invention, the determination of the processing unit characteristics assumes a maximum frequency for a given voltage. Moreover, as the voltage increases, the frequency increases. Thus, as shown in FIG. 11, as the voltage is increased the processing unit may run faster (at a higher frequency), however each operation will require more energy. Additionally, as shown in FIG. 11, the energy per operation will have a minimum due to subthreshold effects.

Generation of Surface Plots

According to a further aspect of the invention, the power source characteristics and the processing unit characteristics may be combined over multiple units to produce a plurality of surface plots of operations/second as a function of frequency and number of operating units, wherein each surface plot represents a particular operating condition. As discussed above, these surface plots may be used by the load manager to determine an optimal point for maximizing computational efficiency.

To generate a surface plot for a particular operating condition, the operations per second may be determined by multiplying the frequency by the number of active operating units, e.g., 100 units at 1 MHz=100 Million operations/second. As discussed above, FIGS. 6 and 7 show a cliff line, or drop-off, 600 on the surface plots. This cliff, or drop-off, 600 represents a line where the power supply cannot provide the minimum voltage to meet the frequency. In other words, this cliff, or drop-off, 600 represents the maximum frequency at which a given number of operating units can operate (or the maximum number of operating units at a given frequency) given the environmentally-determined power condition.

According to an aspect of the invention, the processing unit characteristics shown in FIG. 11 may be used to determine the location of the drop-off or cliff 600. For example, as shown in FIG. 11, at a supply voltage of 0.6V each operation of a processing unit consumes about 0.02 mJ of power. Also, a supply voltage of 0.6V corresponds to some frequency.

Further, according to the invention, a V-I curve for a particular operating condition (e.g., FIG. 9) may be used to determined the power available at the supply voltage of interest. Additionally, the V-I curve may be used to infer a power condition in order to determine an optimal point for maximizing computational efficiency, as set forth below.

Thus, referring to FIG. 9, at a supply voltage of about 0.6V (which corresponds to some frequency) the available power is about 1,000 mJ/s. Since it has previously been determined that each operation consumes about 0.02 mJ of power from the determination of the processing unit characteristics, about 50,000 operations/second may be performed. While it is understood that different units may run at or consume different amounts of power, for these calculations it may be assumed that all units consume the same amount of power. Since the voltage implies, or corresponds to, some frequency, the number of operating units that may run in parallel may be determined. For example, suppose a supply voltage of 0.6V corresponds to a frequency of 25 kHz. Since it has been determined that about 50,000 operations/second may be performed, then 2 operating units may run in parallel under these operating conditions.

Using a supply voltage of 0.2V as another example, as indicated in FIG. 11, operation of a processing unit at a supply voltage of 0.2V consumes about 0.002 mJ/operation. Again, a supply voltage of 0.2V corresponds to some frequency. Further, referring to FIG. 9, operation at a supply voltage of 0.2V indicates about 250 mJ/s of available power. This results in 125,000 operations/second when operating at a supply voltage of 0.2V. The number of parallel operating units may be determined by the frequency that corresponds to the supply voltage of 0.2V. As 125,000 operations/second is considerably better than the 50,000 operations/second achievable with a supply voltage of 0.6V, in this example, a supply voltage of 0.2V would be a better operating point than the supply voltage of 0.6V.

Accordingly, a surface plot may be generated using the power supply characteristics, i.e., V-I curves (e.g., FIG. 9) and the processing unit characteristics (e.g., FIG. 11) for the particular operating conditions represented by the V-I curve used to generate the surface plot. However, as discussed above, the V-I curves (which may be used to generate the surface plots) may change for different power conditions. Accordingly, the surface plots may also change for different power conditions. Thus, according to the invention, a plurality of surface plots should be pre-determined over a range of power conditions, e.g., environmental conditions such as sunlight intensities, so that a load manager 210 may access a surface plot for a particular power condition when that particular power condition arises.

Determining Optimal Point Using a V-I Curve

According to an embodiment of the invention, since the load manager 210 measures the voltage with the voltage A/D converter 320 and the current with the current A/D converter 310, the load manager 210 may select an applicable voltage-current (V-I) curve from a plurality of predetermined V-I curves (example shown in FIG. 9). The generation of the plurality of predetermined V-I curves has been discussed above. This embodiment is similar to the direct measurement of the power available, discussed above; however, instead of using a direct measure of the present power condition, the voltage and current may be measured to infer a present power condition.

As shown in FIG. 9, the solar cell equivalent circuit 800 at the particular operating condition (e.g., solar intensity) indicates an optimum power, or peak 900, at an operating voltage of about 2.2 volts.

Thus, according to the invention, the load manager 210 may determine the present voltage and current generated under the present operating conditions. For example, knowing the present voltage and current, the load manager 210 may determine the applicable V-I curve and identify data associated with the peak 900 on the applicable V-I curve. The load manager may then set the frequency and number of operating units in accordance with the data associated with the peak 900 on the applicable V-I curve. This process is described above with regard to the formation of the surface plots.

Determining Optimal Point Using an Iterative Process

As discussed below, the load manager 210 may include a frequency scaler 350 (process of FIG. 12) or a ring modulator frequency control 440 (process of FIG. 13).

Figure 12:
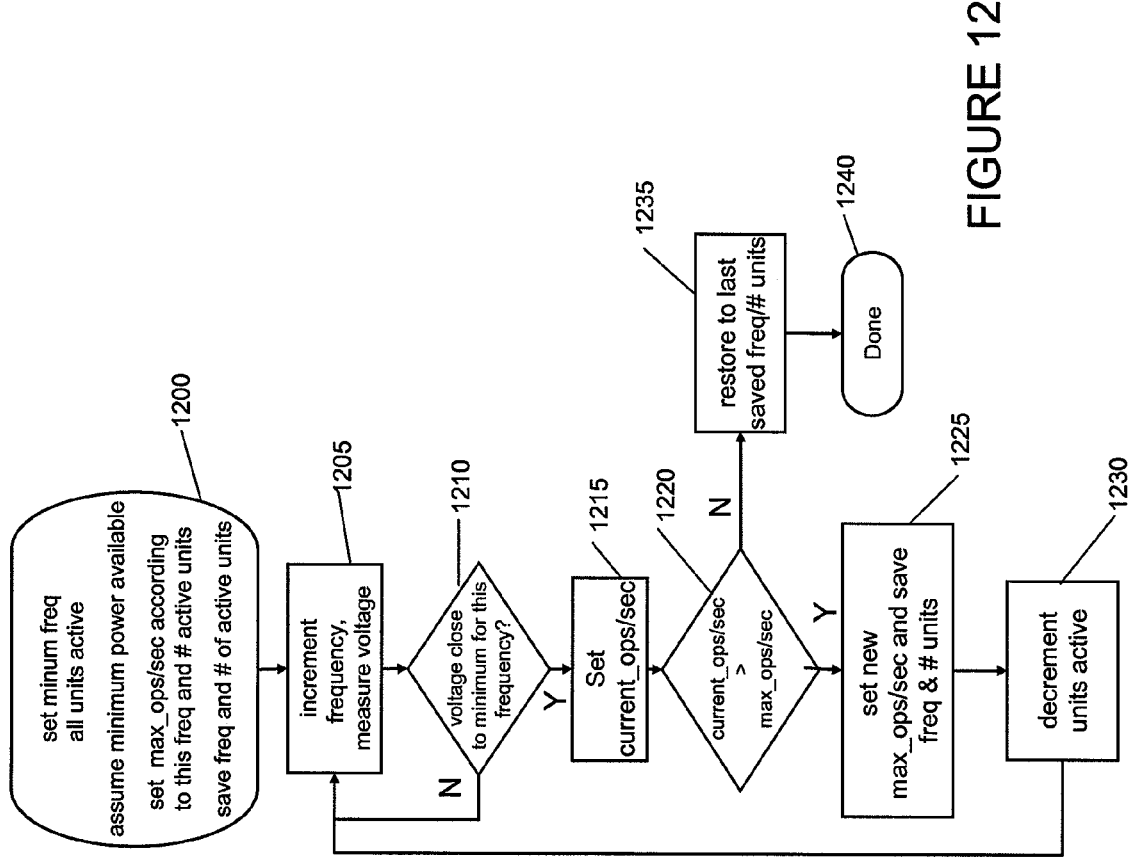
FIG. 12 is a flow chart showing processes according to an aspect of the invention.

FIG. 12 shows a process to determine an optimal point for maximizing computational efficiency in low-power environments, wherein the load manager 210 includes a frequency scaler 350 (as shown in FIG. 3). The load manager 210 may determine an optimal point for maximizing computational efficiency without knowing the present power condition, e.g., environmental condition.

Figure 13:
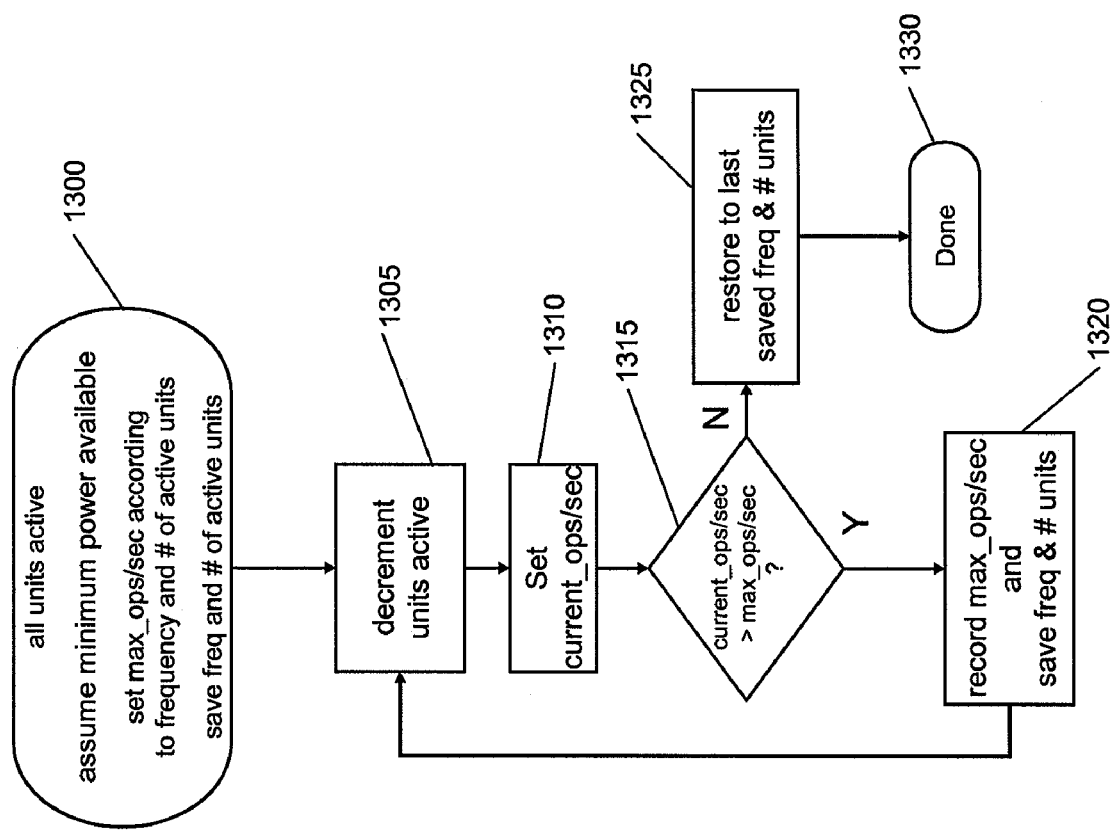
FIG. 13 is a flow chart showing processes according to an aspect of the invention.

The flow diagrams of FIGS. 12 and 13 (and any other flow diagrams) may equally represent high-level block diagrams of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

According to the embodiment of FIG. 12, the frequency and the number of units may be set and an achieved computational efficiency determined. Then, through an iterative process, the frequency and number of units may be varied and a new achieved computational efficiency may be determined. Through this iterative process, the load manager 210 may monitor the effect on computational efficiency until an optimal point for maximizing computational efficiency in low-power environments is determined.

This process may be thought of as moving along the cliff line, or drop-off 600, as shown in FIGS. 6 and 7, and measuring the achieved computational efficiency to search for the data associated with the peak 610. If the achieved computational efficiency begins to decrease, the load manager 210 determines that the peak 610 has been passed. Thus, the load manager 210 reverts back to the settings (e.g., frequency and number of active units) that achieved the peak computational efficiency.

Referring to FIG. 12, at step 1200, a minimum power available may be assumed, the frequency scaler 350 may output the minimum frequency and all processing units may be switched on. Additionally, at step 1200, the achieved operations/second, according to the minimum frequency and number of active units, may be set as the "maximum operations/second". Furthermore, at step 1200, the present frequency setting and number of active units may be stored in memory.

At step 1205, the frequency may be iteratively increased and the voltage measured. At step 1210, a determination of whether the voltage is close to the minimum required for the current frequency setting may be made. For example, the minimum voltage required may be extracted from the surface plot (example of which shown in FIGS. 6 and 7) as the point just before the drop-off or cliff 600. If, at step 1210, it is determined that the voltage is not close to the minimum for the current frequency setting, then, at step 1205, the frequency may again be iteratively increased and the voltage again measured.

If, at step 1210, it is determined that the voltage is close to the minimum for the current frequency setting, at step 1215, the achieved operations/second, according to the present frequency setting and number of active units, may be set as the "current operations/second". At step 1220, the "current operations/second" may be compared to the "maximum operations/second" to determine if the optimal point for maximizing computational efficiency in low-power environments has been crossed (e.g., in moving along the cliff line 600, determining if the peak 610 has been passed). If, at step 1220, it is determined that the "current operations/second" is greater than the "maximum operations/second" (e.g., still moving up the cliff line 600), at step 1225, the "current operations/second" may be set as a new "maximum operations/second" and the present frequency setting and number of units is saved in a memory. At step 1230, the number of active units may be decremented and the process continues at step 1205.

If, at step 1220, it is determined that the "current operations/second" is not greater than the "maximum operations/second" (e.g., the peak 610 has been passed and beginning to descend the cliff line 600 on the other side of the peak 610), then at step 1235, the last saved frequency setting and number of units, which corresponds to the optimal point for maximizing computational efficiency in low-power environments, may be restored. At step 1240, the process may end.

FIG. 13 shows a process to determine an optimal point for maximizing computational efficiency in low-power environments. In this embodiment, the load manager 210 includes the ring oscillator frequency controller 440 (of FIG. 4). With this embodiment, the ring oscillator frequency controller 440 may set a maximum frequency for a given power source voltage and an achieved computational efficiency determined. Then, through an iterative process, the number of units may be varied and a new achieved computational efficiency may be determined. Through this iterative process, the load manager 210 may monitor the effect on computational efficiency until an optimal point for maximizing computational efficiency in low-power environments is determined.

Referring to FIG. 13, at step 1300, a minimum power available may be assumed and all processing units may be turned on. Additionally, at step 1300, an achieved operations/second, according to the present frequency and number of active units, may be set as the "maximum operations/second". Furthermore, at step 1300, the present frequency setting and number of active units may be stored in memory. At step 1305, the active units may be decremented. As should be understood by one skilled in the art, decreasing the number of units switched on at a given frequency is always safe. At step 1310, the newly achieved operations/second, according to the number of active units, may be set as the "current operations/second".

At step 1315, the "current operations/second" is compared to the "maximum operations/second" to determine if the optimal point for maximizing computational efficiency in low-power environments has been crossed (e.g., in moving along the cliff line 600, determining if the peak 610 has been passed). If, at step 1315, it is determined that the "current operations/second" is greater than the "maximum operations/second" (e.g., still moving up the cliff line 600), at step 1320, the "current operations/second" is set as a new "maximum operations/second" and the frequency setting and number of units may be saved in a memory. The process then returns to step 1305.

If, at step 1315, it is determined that the "current operations/second" is not greater than the "maximum operations/second" (e.g., the peak 610 has been passed and beginning to descend the cliff line 600 on the other side of the peak 610), then, at step 1325, the last saved frequency and number of units, which corresponds to the optimal point for maximizing computational efficiency in low-power environments, may be restored. At step 1330, the process may end.

Figure 14:
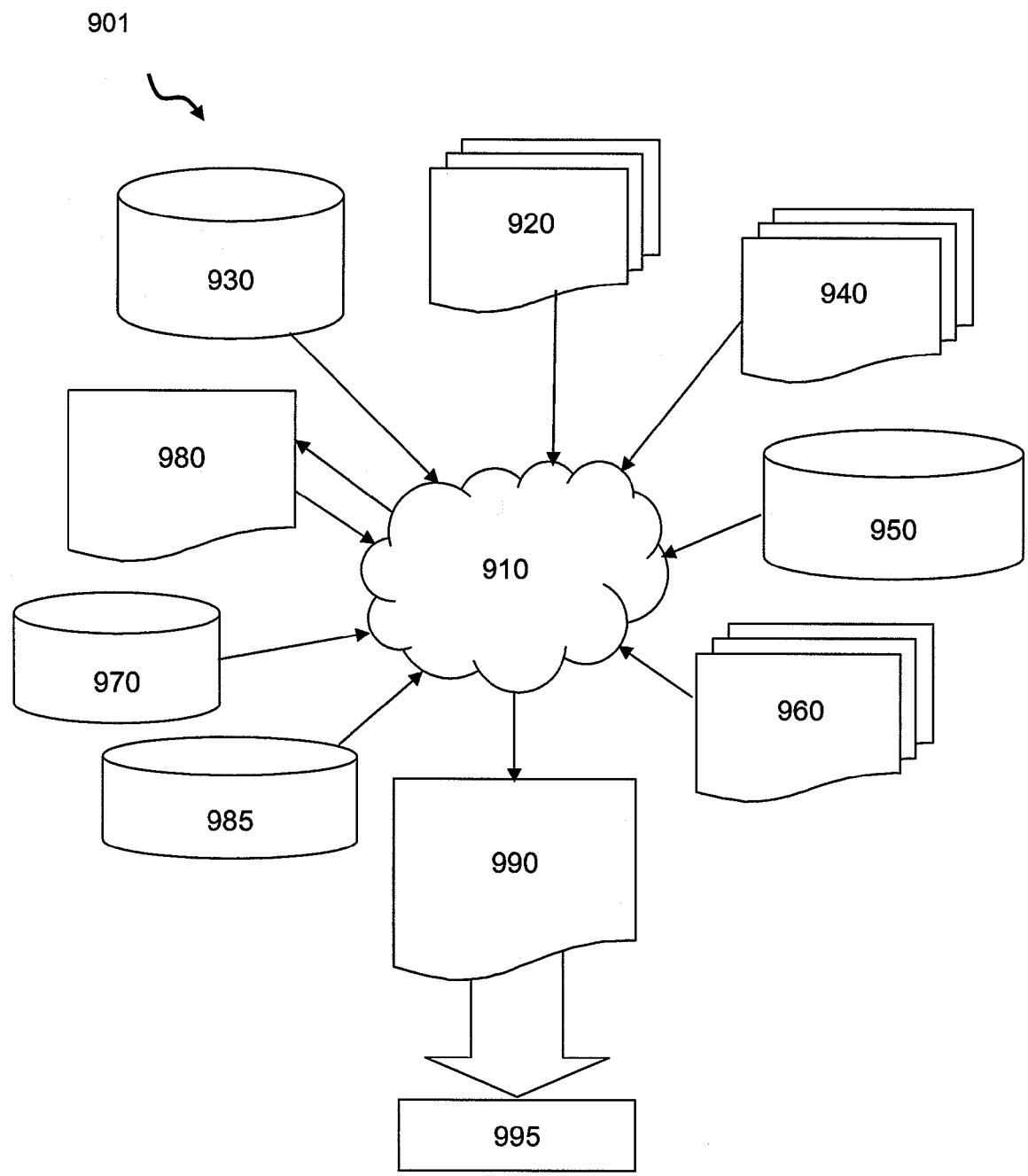
FIG. 14 is a flow diagram of a design process used in semiconductor design, manufacturing, and/or test.

FIG. 14 shows a block diagram of an example design flow 901. Design flow 901 may vary depending on the type of IC being designed. For example, a design flow 901 for building an application specific IC (ASIC) may differ from a design flow 901 for designing a standard component. Design structure 920 is preferably an input to a design process 910 and may come from an IP provider, a core developer, or other design company or may be generated by the operator of the design flow, or from other sources. Design structure 920 comprises a circuit and/or structure (such as, for example, that shown in any one of FIGS. 1-5) in the form of schematics or HDL, a hardware-description language (e.g., Verilog, VHDL, C, etc.). Design structure 920 may be contained on one or more machine readable medium. For example, design structure 920 may be a text file or a graphical representation of a circuit and/or structure (such as, for example, that shown in any one of FIGS. 1-5). Design process 910 preferably synthesizes (or translates) a circuit and/or structure (such as, for example, that shown in any one of FIGS. 1-5) into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in any one of FIGS. 1-5, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in any one of FIGS. 1-5. Design structure 990 may then proceed to a stage 995 where, for example, design structure 990 proceeds to tape-out, is released to manufacturing, is released to a mask house, is sent to another design house, is sent back to the customer, etc.

While the invention has been described in terms of embodiments, those of skill in the art will recognize that the invention can be practiced with modifications and in the spirit and scope of the appended claims.

What is claimed is:

1. A design structure embodied in a computer readable medium for performing a method, the design structure comprising:
   a load manger operable to:
      determine an optimal point for maximizing computational efficiency in a low-power environment, the determining comprising inferring a current power condition; and
      selectively control operation of at least one processing unit of a plurality of processing units in accordance with the determined optimal point,
   wherein the design structure resides on storage medium as a data format used for the exchange of layout data of integrated circuits.

2. The design structure of claim 1, wherein the design structure includes at least one of test data files, characterization data, verification data, or design specifications.

3. The design structure of claim 1, wherein the load manager is further operable to control a frequency of a clock signal transmitted to the at least one processing unit in accordance with the determined optimal point.

4. The design structure of claim 3, wherein the load manager comprises a frequency scaler providing the clock signal.

5. The design structure of claim 3, wherein the load manager comprises a ring oscillator frequency controller providing the clock signal.

6. A design structure embodied in a computer readable medium for performing a method, the design structure comprising:
   a load manger operable to:
      determine an optimal point for maximizing computational efficiency in a low-power environment, the determining comprising inferring a current power condition; and
      selectively control operation of at least one processing unit of a plurality of processing units in accordance with the determined optimal point,
   wherein the design structure comprises a netlist, which describes the circuit.

7. A design structure embodied in a machine readable medium used in a design process, the design structure comprising:

a load manger operable to:
  determine an optimal point for maximizing computational efficiency in a low-power environment;
  selectively control operation of at least one processing unit of a plurality of processing units in accordance with the determined optimal point; and
  at least one of: (i) control a frequency of a clock signal transmitted to the at least one processing unit in accordance with the determined optimal point, and (ii) determine a present power available,
wherein the determined optimal point is determined by sensing or measuring directly available power, and knowing the available power, an applicable surface plot of operations per second as a function of frequency and number of the processing units is accessed such that the optimal point for maximizing computational efficiency in low-power environments is determined from the surface plot for a current operating condition.

8. The design structure of claim 7, wherein the load manager comprises a frequency scaler providing the clock signal.

9. The design structure of claim 7, wherein the load manager comprises a ring oscillator frequency controller providing the clock signal.

10. The design structure of claim 7, wherein the available power is determined by sensing or measuring directly available sunlight.

11. The design structure of claim 7, wherein the applicable surface plot is accessed from a database of surface plots.

12. A design structure embodied in a computer readable medium for performing a method, the design structure comprising:
  a load manager operable to:
    determine an optimal point for maximizing computational efficiency in a low-power environment;
    selectively control operation of at least one processing unit of a plurality of processing units in accordance with the determined optimal point;
    determine a present power available;
    select from data, obtained from an analysis of operations/second versus frequency of operation and number of active processing units, applicable data based upon the determined present power available; and
    determine the optimal point for maximizing computational efficiency from the applicable data.

13. The design structure of claim 12, wherein the load manager is further operable to control a frequency of a clock signal transmitted to the at least one processing unit in accordance with the determined optimal point.

14. The design structure of claim 13, wherein the load manager comprises a frequency scaler providing the clock signal.

15. The design structure of claim 13, wherein the load manager comprises a ring oscillator frequency controller providing the clock signal.

16. The design structure of claim 12, wherein the available power is determined by sensing or measuring directly available sunlight.

17. The design structure of claim 12, wherein the data is pre-determined and stored in a memory.

18. A design structure embodied in a computer readable medium for performing a method, the design structure comprising:
  a load manager operable to:
    determine an optimal point for maximizing computational efficiency in a low-power environment, the determining comprising inferring a current power condition;
    selectively control operation of at least one processing unit of a plurality of processing units in accordance with the determined optimal point;
    assume a minimum power available;
    activate all processing units;
    output a minimum frequency as a present frequency to the active processing units;
    save the present frequency and a number which is representative of a quantity of active processing units;
    designate an operations/second, determined according to the present frequency and the quantity of active processing units, as a maximum operations/second;
    increase the present frequency to a new present frequency where a voltage is at about a minimum for the new present frequency;
    designate an operations/second, determined according to the new present frequency and the quantity of active processing units, as a current operations/second;
    set the current operations/second as a new maximum operations/second, saving the new present frequency and the number which is representative of the quantity of active processing units, and decrementing the quantity of active units, if the current operations/second is greater than the maximum operations/second; and
    restore a last saved present frequency and a last saved number representative of the quantity of active units, if the current operations/second is not greater than the maximum operations/second.

19. A design structure embodied in a computer readable medium for performing a method, the design structure comprising:
  a load manger operable to:
    determine an optimal point for maximizing computational efficiency in a low-power environment, the determining comprising inferring a current power condition;
    selectively control operation of at least one processing unit of a plurality of processing units in accordance with the determined optimal point;
    assume a minimum power available;
    activate all processing units;
    output a maximum frequency, based on a given power source voltage, as a present frequency to the active processing units;
    save the present frequency and a number representative of a quantity of active processing units;
    designate an operations/second, determined according to the present frequency and the quantity of active processing units, as a maximum operations/second;
    decrement the quantity of active processing units;
    designate an operations/second, determined according to the present frequency and a new quantity of active processing units, as a current operations/second;
    set the current operations/second as a new maximum operations/second and saving the new present frequency and a number representative of the new quantity of active processing units, if the current operations/second is greater than the maximum operations/second; and
    restore a last saved present frequency and a last saved number representative of the quantity of active units, if the current operations/second is not greater than the maximum operations/second.

* * * * *